United States Patent
Goyal

(10) Patent No.: US 11,803,572 B2
(45) Date of Patent: *Oct. 31, 2023

(54) SCHEMA-BASED SPATIAL PARTITIONING IN A TIME-SERIES DATABASE

(71) Applicant: Amazon Technologies, Inc., Seattle, WA (US)

(72) Inventor: Dumanshu Goyal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,223

(22) Filed: Jan. 3, 2022

(65) Prior Publication Data

US 2022/0121684 A1 Apr. 21, 2022

Related U.S. Application Data

(63) Continuation of application No. 16/579,715, filed on Sep. 23, 2019, now Pat. No. 11,216,487.

(51) Int. Cl.
*G06F 16/27* (2019.01)
*G06F 16/21* (2019.01)
(Continued)

(52) U.S. Cl.
CPC .......... *G06F 16/278* (2019.01); *G06F 16/212* (2019.01); *G06F 16/2255* (2019.01);
(Continued)

(58) Field of Classification Search
CPC ............. G06F 16/278; G06F 16/24568; G06F 16/285; G06F 16/2255; G06F 16/2477;
(Continued)

(56) References Cited

U.S. PATENT DOCUMENTS 5,765,171 A 6/1998 Gehani et al.
6,256,634 B1 7/2001 Moshaiov et al.
(Continued)

OTHER PUBLICATIONS

U.S. Appl. No. 16/116,791, filed Aug. 29, 2018, Mustafa Ozan Ozen.
(Continued)

*Primary Examiner* — Evan Aspinwall
(74) *Attorney, Agent, or Firm* — Robert C. Kowert; Kowert, Hood, Munyon, Rankin & Goetzel, P.C.

(57) ABSTRACT

Methods, systems, and computer-readable media for schema-based spatial partitioning in a time-series database are disclosed. A time-series database divides elements of time-series data of a plurality of time series into partitions according to a clustering scheme. The time series are associated with respective schemas. The schemas comprise dimension names and measure names. The clustering scheme is determined based (at least in part) on the schemas and dimension values, and the schemas are determined based (at least in part) on the elements of time-series data. The time-series database stores the elements of time-series data from the plurality of partitions into one or more storage tiers. The time-series database performs a query of the time-series data in one or more of the storage tiers. The query is performed based (at least in part) on the clustering scheme.

20 Claims, 10 Drawing Sheets

(51) Int. Cl.
*G06F 16/28* (2019.01)
*G06F 16/22* (2019.01)
*G06F 16/2458* (2019.01)
*G06F 16/2455* (2019.01)

(52) U.S. Cl.
CPC ...... *G06F 16/2264* (2019.01); *G06F 16/2477* (2019.01); *G06F 16/24568* (2019.01); *G06F 16/285* (2019.01)

(58) Field of Classification Search
CPC ... G06F 16/212; G06F 16/2264; G06F 16/211
USPC .......................................................... 707/737
See application file for complete search history.

(56) References Cited

U.S. PATENT DOCUMENTS

| | | | |
|---|---|---|---|
| 8,132,046 | B2 | 3/2012 | Varghese |
| 8,219,581 | B2 | 7/2012 | Roy et al. |
| 8,276,154 | B2 | 9/2012 | Toub et al. |
| 8,335,765 | B2 | 12/2012 | Sivasubramanian et al. |
| 8,386,540 | B1 | 2/2013 | McAlister et al. |
| 8,595,547 | B1 | 11/2013 | Sivasubramanian et al. |
| 8,601,112 | B1 | 12/2013 | Nordstrom et al. |
| 8,965,849 | B1 | 2/2015 | Goo |
| 9,069,827 | B1 | 6/2015 | Rath et al. |
| 9,286,001 | B2 | 3/2016 | Skjolsvold et al. |
| 9,449,122 | B2 | 9/2016 | Haas et al. |
| 9,607,019 | B1 | 3/2017 | Swift et al. |
| 9,607,067 | B2 | 3/2017 | Haas et al. |
| 9,626,374 | B2 | 4/2017 | Hirsch et al. |
| 9,672,257 | B2 | 6/2017 | Tobin et al. |
| 9,773,015 | B2 | 9/2017 | Guo et al. |
| 9,817,727 | B2 | 11/2017 | McAlister et al. |
| 9,836,492 | B1 | 12/2017 | Hermanson |
| 9,934,107 | B1 | 4/2018 | Chikkanayakanahally et al. |
| 10,007,513 | B2 | 6/2018 | Malladi et al. |
| 10,459,827 | B1 | 10/2019 | Aghdaie et al. |
| 10,776,355 | B1 | 9/2020 | Batsakis et al. |
| 10,997,137 | B1 | 5/2021 | Goyal et al. |
| 11,068,537 | B1 | 7/2021 | Goyal et al. |
| 11,258,683 | B2 | 2/2022 | Park |
| 2008/0052322 | A1 | 2/2008 | Gusciora |
| 2010/0121817 | A1 | 5/2010 | Meyer et al. |
| 2010/0153953 | A1 | 6/2010 | Adl-Tabatabai et al. |
| 2011/0282836 | A1 | 11/2011 | Erickson et al. |
| 2014/0067810 | A1 | 3/2014 | Wisnovsky |
| 2014/0236890 | A1* | 8/2014 | Vasan ................. G06F 11/2094 707/610 |
| 2015/0134626 | A1 | 5/2015 | Theimer et al. |
| 2015/0134795 | A1 | 5/2015 | Theimer et al. |
| 2015/0134796 | A1 | 5/2015 | Theimer et al. |
| 2016/0334998 | A1 | 11/2016 | George et al. |
| 2016/0357828 | A1 | 12/2016 | Tobin et al. |
| 2017/0177646 | A1 | 1/2017 | Chen et al. |
| 2017/0060574 | A1 | 3/2017 | Malladi et al. |
| 2017/0103103 | A1 | 4/2017 | Nixon et al. |
| 2017/0177546 | A1 | 6/2017 | Heinz et al. |
| 2017/0228257 | A1 | 8/2017 | Dong et al. |
| 2018/0089328 | A1* | 3/2018 | Bath ...................... G06F 16/22 |
| 2018/0332367 | A1 | 5/2018 | Kaitchuck |
| 2018/0232422 | A1 | 8/2018 | Park et al. |
| 2018/0246934 | A1* | 8/2018 | Arye .................... G06F 16/278 |
| 2018/0316568 | A1 | 11/2018 | Gill |
| 2019/0065278 | A1 | 2/2019 | Jeuk et al. |
| 2019/0095241 | A1 | 3/2019 | Ago et al. |
| 2019/0146849 | A1 | 5/2019 | Leonard et al. |
| 2019/0236149 | A1* | 8/2019 | Kuruvada ........... G06Q 10/063 |
| 2019/0250819 | A1 | 8/2019 | Jain et al. |

OTHER PUBLICATIONS

U.S. Appl. No. 16/176,629, filed Oct. 31, 2018, Dumanshu Goyal.
U.S. Appl. No. 16/199,102, filed Nov. 23, 2018, Timothy A. Rath.
U.S. Appl. No. 16/199,103, filed Nov. 23, 2018, Timothy A. Rath.
U.S. Appl. No. 16/199,078, filed Nov. 23, 2018, Timothy A. Rath.
U.S. Appl. No. 16/267,330, filed Feb. 4, 2019, Dumanshu Goyal.
U.S. Appl. No. 16/008,940, filed Jun. 14, 2018, Rajneesh Kumar.
U.S. Appl. No. 16/216,580, filed Dec. 11, 2018, Dumanshu Goyal.
U.S. Appl. No. 16/219,686, filed Dec. 13, 2018, Dumanshu Goyal.
U.S. Appl. No. 16/287,822, filed Feb. 27, 2019, Dumanshu Goyal.
U.S. Appl. No. 16/453,914, filed Jun. 26, 2019, Gaurav Saxena.
U.S. Appl. No. 16/455,591, filed Jun. 27, 2019, Gaurav Saxena.
U.S. Appl. No. 16/579,717, filed Sep. 23, 2019, Dumanshu Goyal.
U.S. Appl. No. 17/349,786, filed Jun. 16, 2021, Sudipto Das.
U.S. Appl. No. 17/349,790, filed Jun. 16, 2021, Sudipto Das.

* cited by examiner

SCHEMA-BASED SPATIAL PARTITIONING IN A TIME-SERIES DATABASE

BACKGROUND

This application is a continuation of U.S. patent application Ser. No. 16/579,715, filed Sep. 23, 2019, which is hereby incorporated by reference herein in its entirety.

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1:
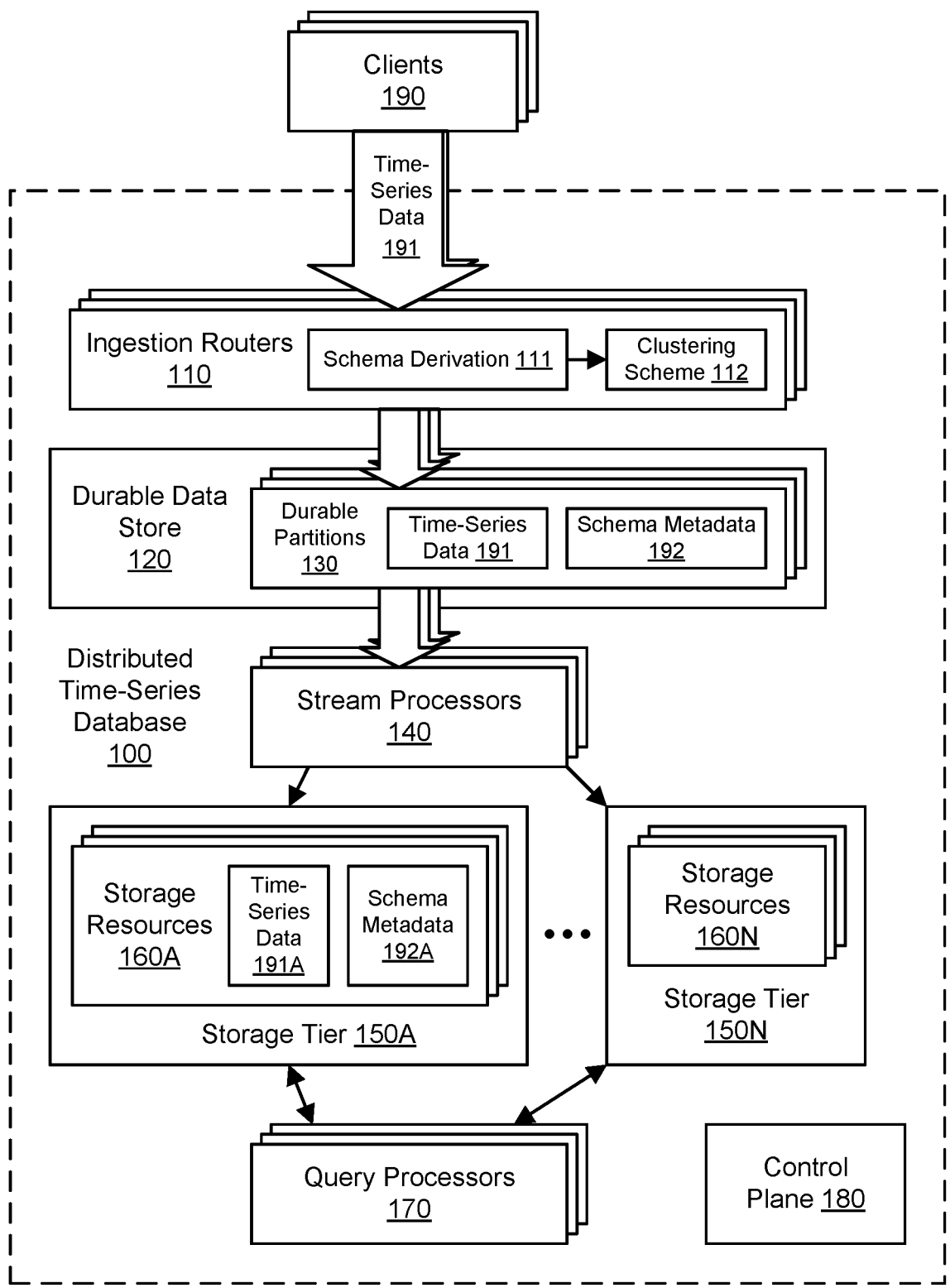
FIG. 1 illustrates an example system environment for schema-based spatial partitioning in a time-series database, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for schema-based spatial partitioning in a time-series database are described. A time-series database may include a set of ingestion routers that receive and spatially partition time-series data into a set of non-overlapping partitions. A particular time series may be defined by a schema that includes components such as one or more dimension names and a measure name. As ingested by the time-series database, an element of time-series data may include all the schema components as well as one or more dimension values and a measure value that represents a particular data point in the time series. The time-series database may also include a set of stream processors, also referred to as writers, which process the time-series data in the partitions. For example, the stream processors may write elements of time-series data to one or more storage tiers, such as a "hot" tier that offers low-latency and high-availability write and read access to a set of distributed storage nodes. The time-series database may further include a set of query processors that perform queries of the time-series data in the one or more storage tiers.

To optimize tasks such as queries, datasets may be clustered into partitions using a clustering scheme that co-locates related time series. The clustering scheme may represent a multi-level hashing scheme. The clustering scheme may be based (at least in part) on schemas for individual time series that are derived from ingested data and not necessarily formally specified by customers. The clustering scheme may also be based (at least in part) on dimension values. For example, to generate a hash representing an individual time series, a clustering scheme for a particular table may first hash the measure name for the various time series, then concatenate a hash for the dimension names, then concatenate a hash for the dimension values. Using this particular technique, by representing the measure name as a prefix in the hash for an individual time series, various time series that have the same measure name may be clustered together in the partitions and in the storage tier(s). Queries for time-series data having the same measure name may then be performed more efficiently, e.g., by identifying the partition(s) associated with the hash of the measure name and implementing the query only using the identified partition(s) in the relevant storage tier(s). Different clustering schemes may use different orders and interleaving approaches for the dimension names, dimension values, or measure names. In one embodiment, customers may indicate orderings of schema components for particular time series, e.g., to optimize storage and retrieval of time-series data for the needs of particular customers. However, in the absence of such customer-provided information, a default clustering scheme may be used to partition time-series data such that the majority of queries are optimized.

The time series for a particular customer may have a high cardinality. For example, a set of Internet of Things (IoT) sensor devices managed by a customer may emit sensor data over time for a large number of locations (e.g., dimension values for a location dimension), such that each individual device and measurement type is represented by a different time series (and corresponding schema with individual values). A customer may seek to explore the time-series schemas and dimension values under its management (e.g., in a particular table of the time-series database) to generate appropriate queries using some portion of the schemas (and dimension values), perform validation of the schemas, or perform other tasks that require knowledge of the schemas. Instead of maintaining a separate metadata index for schema information, the schema information (including dimension values) may be co-located with the corresponding time-series data, e.g., in the same tiles in a hot storage tier or files in a cold storage tier, such that the schema metadata can take advantage of spatial and temporal scaling capabilities of the time-series database. The co-location of time-series data with schema metadata may provide for quick discovery of schemas in order to optimize schema exploration as well as queries.

As one skilled in the art will appreciate in light of this disclosure, embodiments may be capable of achieving certain technical advantages, including some or all of the following: (1) reducing the latency of queries in a distributed time-series database by using a clustering scheme to co-locate related time series based on their schemas; (2) improving the performance of queries in a distributed time-series database by providing low-latency exploration of schema metadata usable for building or revising queries; (3) reducing storage use in a distributed time-series database by co-locating time-series data and metadata instead of maintaining them using separate resources; (4) reducing storage use in a distributed time-series database by using a clustering scheme to co-locate related time series for more efficient compression; (5) improving the performance of schema validation in a distributed time-series database by using a clustering scheme to co-locate related time series based on their schemas; (6) improving the scalability of a time-series database for high-cardinality data sets using partitioning and auto-scaling for both time-series data and metadata; and so on.

FIG. 1 illustrates an example system environment for schema-based spatial partitioning in a time-series database, according to some embodiments. A distributed time-series database 100 may ingest and store time-series data 191 and make the stored data available for queries and other computations and tasks. Elements of the time-series data 191 may be received by the database 100 from clients 190 over time, e.g., as one or more streams of time-series data. Clients 190 may represent various types of client devices that generate or otherwise provide data in various time series to the database 100. A time series may include a set of values that change over time, such as sensor measurements or system metrics, and that are timestamped or otherwise positioned along a temporal axis. For example, a set of client devices 190 may repeatedly gather information such as vibration, temperature, and pressure using sensors. As another example, a set of client devices 190 may detect state transitions, e.g., in a computer network. Client devices 190 that provide the time-series data 191 to the database 100 may be associated with various domains such as Internet of Things (IoT) and "smart home" networks, autonomous vehicles, manufacturing facilities, distribution facilities, computational resources in a multi-tenant provider network, facilities management systems, stock trading systems, and so on. Some time series or hierarchies of time series may include very large numbers of measurements. For example, a multi-tenant provider network may monitor trillions of events per day. As another example, a fulfillment center for an online store may have thousands of sensors that monitor the state of equipment, goods, and software. In order to efficiently ingest, transform, store, and/or query such large quantities of data, the distributed database 100 may employ scaling techniques while keeping the database online for continued ingestion and querying. By decoupling various stages of the distributed database 100 from each other, individual portions of the database may be scaled up or down by a control plane 180 to make better use of computational and storage resources while permitting near-real-time ingestion and querying of time-series data. Using the techniques described herein, the same or similar scaling approaches may be used for time-series metadata (e.g., schema metadata) as for time-series data.

The ingested time-series data 191 may represent a large number (high cardinality) of individual time series. An individual time series may include a sequence of values or observations (e.g., for a feature of a system or a phenomenon) that can be plotted over time. An individual time series may be uniquely identified by a set of dimensions (with dimension values) such as what the observations are measuring, where the observations were measured, client-specified tags such as device model or instance type, and so on. For example, a smart-home device may produce a time series representing measurements of humidity in a particular room at a particular address. The same device may also produce other time series representing measurements at the same location for temperature, dust levels, carbon dioxide, and so on. As another example, a virtual compute instance in a multi-tenant provider network may emit a time series representing CPU utilization over time, another time series representing disk reads over time, yet another time series representing network packets received over time, and so on. Because developers often operate on related time series together, time series that are related (e.g., by physical proximity, by being generated by the same device, and so on) may be clustered using the database 100 for efficient storage and retrieval. To enable such applications, the database 100 may offer a query language that provides filtering according to dimensions such as the device model, instance type, region, address, location, and so on, as well as the measure name. In one embodiment, any change to such a dimension may produce a new time series in the database 100.

The database 100 may manage a large amount of time-series data throughout the lifecycle of the data. The times-series data 191 may be received at the database 100 using a fleet of hosts referred to as ingestion routers 110. The time-series data may typically arrive at the database 100 in time order, but the database may be able to ingest out-of-order data as well. The ingestion routers 110 may divide the data 191 from the clients 190 into non-overlapping ingestion partitions 130. In one embodiment, the ingested data may be spatially partitioned along non-overlapping spatial boundaries according to the time series or range of the data, one or more tags associated with the data, the region that produced the data, the category to which the data belongs, and/or other suitable metadata. Ingested time-series data may be mapped to different partitions based on hierarchical clustering in order to achieve better performance of data storage and retrieval. A partition may include one time series or multiple time series.

A particular time series may be defined by a schema that includes components such as one or more dimension names (e.g., "Region") having one or more dimension values (e.g., "US-West") and a measure name (e.g., "temperature"). As ingested by the time-series database 100, an element of time-series data may include all the schema components (including dimension values) as well as a measure value that represents a particular data point in the time series. In one embodiment, the ingestion routers 110 may include a component for schema derivation 111 that derives the schema and dimension values for an element of time-series data from the ingested information and not necessarily from a formal definition of a schema by a customer that manages the client devices 190. The time-series database 100 may be referred to as "schema-less" in that a customer need not formally specify the schema using a control plane 180 or other channel separate from the ingested data 191. Thus clients 190 may begin providing the data 191 to the database 100 more quickly and without performing additional control-plane operations or other configuration tasks.

The ingestion routers 110 may use a clustering scheme 112 to divide the ingested data 191 into various partitions 130. The clustering scheme 112 may co-locate related time series for optimization of queries and other tasks. The clustering scheme 112 may represent a multi-level hashing scheme in which a hash value for a time series is generated by concatenating hash values for different components of the schema (and dimension values) for the time series. The clustering scheme 112 may be based (at least in part) on schemas and dimension values for individual time series that are derived from ingested data 191 and not necessarily formally specified by customers. For example, to generate a hash representing an individual time series, a clustering scheme 112 for a particular table may first hash the measure name for the various time series, then concatenate a hash for the dimension names, then concatenate a hash for the dimension values. By representing the measure name as a prefix in the hash for an individual time series, various time series that have the same measure name may be clustered together in the partitions 130 and throughout their remaining lifecycle in the database 100. As another example, another clustering scheme 112 may first hash the dimension names, then concatenate a hash for the dimension values, then concatenate a hash for the measure name. As yet another example, another clustering scheme 112 may interleave the dimension names and dimension values (e.g., a hash of a first dimension name, a hash of a first dimension value, a hash of a second dimension name, a hash of a second dimension value, and so on) and then concatenate a hash for the measure name. In one embodiment, the clustering scheme 112 may represent a default scheme that is intended to optimize query performance for a large number (e.g., a majority) of queries for a given table. In one embodiment, the clustering scheme 112 may be selected by a customer, e.g., on a table-by-table basis.

The ingestion partitions 130 may be maintained using persistent storage resources and may be termed durable partitions. In various embodiments, the durable partitions 130 may be provided by a streaming service or other durable data store 120. The streaming service or durable data store 120 may also be referred to as a journal. The streaming service or durable data store 120 may use shards or other divisions to implement the non-overlapping partitions 130. The use of the durable partitions 130 as a staging area may permit the database 100 to decouple ingestion from stream processing and storage. Acknowledgements of requests to add time-series data elements may be sent to the clients 190 upon the successful addition of time-series data elements to the partitions 130.

In addition to the ingestion routers 110, the database 100 may include hosts such as stream processors 140 and query processors 170. A fleet of stream processors 140 may take the time-series data from the durable partitions 130, potentially process the data in various ways, and add the data to one or more storage tiers 150A-150N. For example, one stream processor may write data from one partition to a "hot" storage tier, and another stream processor may write data from the same partition to a "cold" storage tier. In various embodiments, stream processors may perform reordering, deduplication, aggregation of different time periods, rollups, and other transformations on time series data. Stream processors 140 may perform tasks such as creating materialized views or derived tables based on a partition, such as an aggregation or rollup of a time interval. The tasks may include continuous queries that are performed repeatedly over time, e.g., to create aggregations for each hour or day of a time series as that time period is finalized. By co-locating related time-series using the clustering scheme 112, tasks such as aggregations and cross-series rollups may be optimized or otherwise have their performance improved.

The data 191 may be routed from the durable partitions 130 to the stream processors 140 according to routing metadata, e.g., that maps different time series or ranges of the data to different stream processors. In one embodiment, a given stream processor may be assigned to one and only one partition at a time. In one embodiment, the stream processors 140 may organize the time series in tables. The stream processors 140 may also be referred to as writers or table builders. A table may store multiple time series. A table may be a named entity that stores related time series that are usable by the same application and often managed by the same customer of the database 100. A data point (e.g., an element) in a time series may be stored in a record. Data points or elements of time-series data may be added to the database 100 using application programming interface (API) calls or other programmatic interfaces. In one embodiment, data points for multiple time series (e.g., for related time series generated by the same client device) with the same timestamp may be added by a client using a single API call. A data point may be associated with a timestamp, one or more dimensions (in name-value pairs) representing characteristics of the time series, and a measure representing a variable whose value is tracked over time. Timestamps may be provided by clients or automatically added upon ingestion. Measures may be identified by names and may often have numeric values. Measures may be used by the database 100 in generating aggregations such as min, max, average, and count. For example, a time series related to automobiles may be identified by a unique combination of values for dimensions of a vehicle identification number (VIN), country, state, and city, while measures for such a time series may include the battery state and the miles traveled per day. In one embodiment, queries may specify time intervals and/or dimension names and/or dimension values instead of or in addition to individual measures.

The database 100 may adapt to varying throughput quickly and dynamically, e.g., such that clients can begin providing time-series data without prior allocation of hosts and storage resources and without providing a formal declaration of a schema. In some embodiments, the control plane 180 may dynamically increase or decrease the number of partitions based (at least in part) on the amount or rate of ingestion of time-series data. The database 100 may co-locate the time-series data 191 (e.g., the individual measurements or data points) with the schema metadata 192 derived from the ingested data 191 by the ingestion routers 110. As shown in FIG. 1, the time-series data 191 may be co-located with the corresponding schema metadata 192 in the durable partitions 130. Similarly, in the storage tiers such as tier 150A, the time-series data 191A may be co-located with the corresponding schema metadata 192A. The scaling performed by the control plane 180 may thus be applied to both the time-series data and to the corresponding schema information.

The various storage tiers 150A-150N may represent different use cases for time-series data. The storage tiers 150A-150N may differ in their performance characteristics, durability characteristics, and cost characteristics. For example, the database 100 may include a hot tier (such as tier 150A) that offers the lowest latency by storing recent time-series data in volatile memory resources (e.g., random access memory) across a distributed set of storages nodes. As another example, the database 100 may include a cold tier that offers higher latency (but a lower cost) by storing a longer interval of time-series data using persistent storage resources such as disk drives. The database 100 may include other tiers such as a warm tier that stores recent time-series data in nonvolatile storage resources (e.g., solid-state drives) across a distributed set of storages nodes, a frozen tier that stores even older time-series data in sequential access storage media, and so on. Based on their needs and budgets, users of the time-series database 100 may select and configure one or more of the storage tiers 150A-150N for storage of their time-series data.

In one embodiment, the database 100 may represent a container of tables and policies, such as retention policies. Policies may be applied at the database level for all tables or may be overridden for individual tables. The database 100 may offer a control plane 180 that permits customers (e.g., developers of applications) and other systems to perform management and modeling of time series data. For example, a component for time-series data management of the control plane 180 may offer APIs for creating, deleting, and listing tables (or entire databases); describing tables and policies; creating and updating policies and associating policies with tables; listing series within a table; and so on. A retention policy may determine the time interval for which an element of time-series data is kept in a particular tier; beyond that time interval, the time-series data may expire and may be deleted from the tier. Different tiers may differ in their retention policies for time-series data. Tables may also differ in their retention policies. In one embodiment, for example, the database 100 may have default retention periods of three hours for the hot tier and one year for the cold tier. In one embodiment, costs may be assessed to clients for the use of the database 100 to store their time-series data, and the per-measure costs assessed for the hot tier may be greater than the per-measure costs for the cold tier. Accordingly, customers may adjust the retention policies to reach a balance between performance (e.g., query latency) and cost.

The time-series data may be deemed immutable once written to a particular storage tier, e.g., such that new values may be appended to a time series but existing values may not be deleted (except for expiration based on a retention policy). Using a fleet of query processors 170, queries of time-series data may be performed for particular time intervals. Query processors 170 may perform tasks such as one-time queries of time-series data in one or more storage tiers 150A-150N, transformations of time-series data, and other computations. The database 100 may enable specialized mathematical functions such as interpolation, approximation, and smoothing to be performed on time-series data, e.g., in order to find trends and patterns. By contrast, traditional relational database management systems may require developers to write complex application code in order to perform such functions. By interacting with the query processors 170, various applications may use the database 100 to perform analysis of time-series data. For example, machine learning and machine vision applications may use time-series data managed by the database 100.

Using the clustering scheme 112 based on derived schema metadata 192, various time series that are similar (e.g., that have the same measure name) may be clustered together in the partitions 130 and in the storage tier(s) 150A-150N. Queries for time-series data having the same measure name (or other hash prefix in the selected clustering scheme) may then be performed more efficiently. The same clustering scheme 112 may be used throughout the database 100 to optimize both storage and retrieval of time-series data. For example, one of the query processors 170 may use the same clustering (hashing) scheme 112 to identify the partition(s) associated with the hash of the measure name (or other prefix of the partition hash) and implement the query only using the identified partition(s) in the relevant storage tier(s).

The time series for a particular customer may have a high cardinality. For example, a set of Internet of Things (IoT) sensor devices 190 managed by a customer may emit sensor data over time for a large number of dimension values (e.g., specific locations), such that each individual device and measurement type is represented by a different time series (and corresponding schema with dimension values). A customer may seek to explore the time-series schemas under its management (e.g., in a particular table of the time-series database 100) to generate appropriate queries using some portion of the schemas (and dimension values), perform validation of the schemas, or perform other tasks that require knowledge of the schemas. In one embodiment, the query processors 170 and/or control plane may include a component for schema metadata exploration and acquisition. The schema metadata exploration component may determine all or part of the schema metadata for one or more time series associated with one or more partitions. For example, a user may use the schema metadata exploration to identify the partitions for a particular measure name and then drill down into the dimension names and/or dimension values in the schema metadata to build a query. The co-location of time-series data with schema metadata may provide for quick discovery of schemas in order to optimize schema exploration as well as query performance.

In one embodiment, one or more components of the distributed database 100, such as hosts 110, 140 and 170, other compute instances, and/or storage resources, may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide resources such as the ingestion routers 110, durable partitions 130, stream processors 140, storage resources 160A-160N, and/or query processors 170. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the distributed database 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. In one embodiment, portions of the functionality of the provider network, such as the distributed database 100, may be offered to clients in exchange for fees.

In one or more of the storage tiers such as tier 150A, the time-series data may be partitioned into a set of tiles along non-overlapping temporal and spatial boundaries. A tile may thus represent a partition of time-series data within a time range (between a starting time and an ending time) and within a range of keys. The storage resources 160A for such a tier 150A may also include a set of storage nodes that are distributed across various data centers, availability zones, or other logical or geographical locations. A tile may be replicated across the storage nodes with a group of replicas (e.g., three replicas) that are eventually consistent without using a server-side consensus mechanism.

Figure 8:
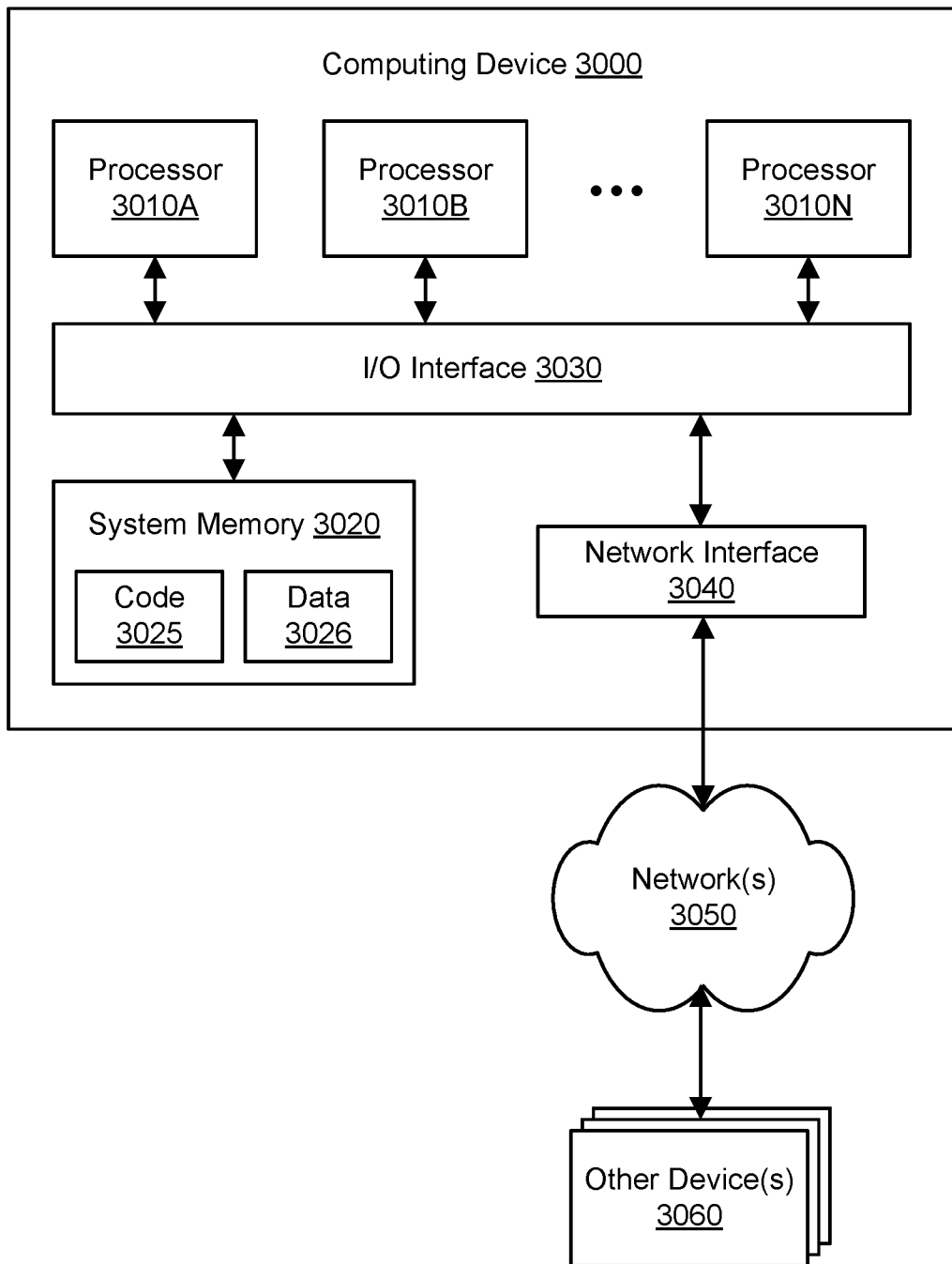
FIG. 8 illustrates an example computing device that may be used in some embodiments.

In various embodiments, components of the distributed database 100, such as the ingestion routers 110, streaming service 120, stream processors 140, storage resources 160A-160N, query processors 170, heat analyzer 185, and/or control plane 180 may be implemented using any suitable number and configuration of computing devices, any of which may be implemented by the example computing device 3000 illustrated in FIG. 8. In some embodiments, the computing devices may be located in any suitable number of data centers or geographical locations. In various embodiments, at least some of the functionality of the distributed database 100 may be provided by the same computing device or by different computing devices. In various embodiments, if any of the components of the distributed database 100 are implemented using different computing devices, then the components and their respective computing devices may be communicatively coupled, e.g., via one or more networks. Any of the components of the distributed database 100 may represent any combination of software and hardware usable to perform their respective functions. In some embodiments, operations implemented by the distributed database 100 may be performed automatically, e.g., without a need for user initiation or user intervention after an initial configuration stage, and/or programmatically, e.g., by execution of program instructions on at least one computing device. In some embodiments, the distributed database 100 may include additional components not shown, fewer components than shown, or different combinations, configurations, or quantities of the components shown.

Clients 190 of the distributed database 100 may represent external devices, systems, or entities with respect to the database. Client devices 190 may be managed or owned by one or more customers of the database 100. For example, a particular customer may be a business that sells sensor devices for installation in residences and businesses, and those sensor devices may represent the client devices 190. In one embodiment, the client devices may be implemented using any suitable number and configuration of computing devices, any of which may be implemented by the example computing device 3000 illustrated in FIG. 8. Clients 190 may convey network-based service requests to the ingestion router fleet 110 via one or more networks, e.g., to supply a stream of data for processing using the stream processors 140 and storage in the storage tiers 150A-150N. The network(s) may encompass any suitable combination of networking hardware and protocols necessary to establish network-based communications between client devices 190 and the distributed database 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the distributed database 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the distributed database 100. In one embodiment, client devices may communicate with the distributed database 100 using a private network rather than the public Internet. In various embodiments, the various components of the distributed database 100 may also communicate with other components of the distributed database using one or more network interconnects.

Figure 2:
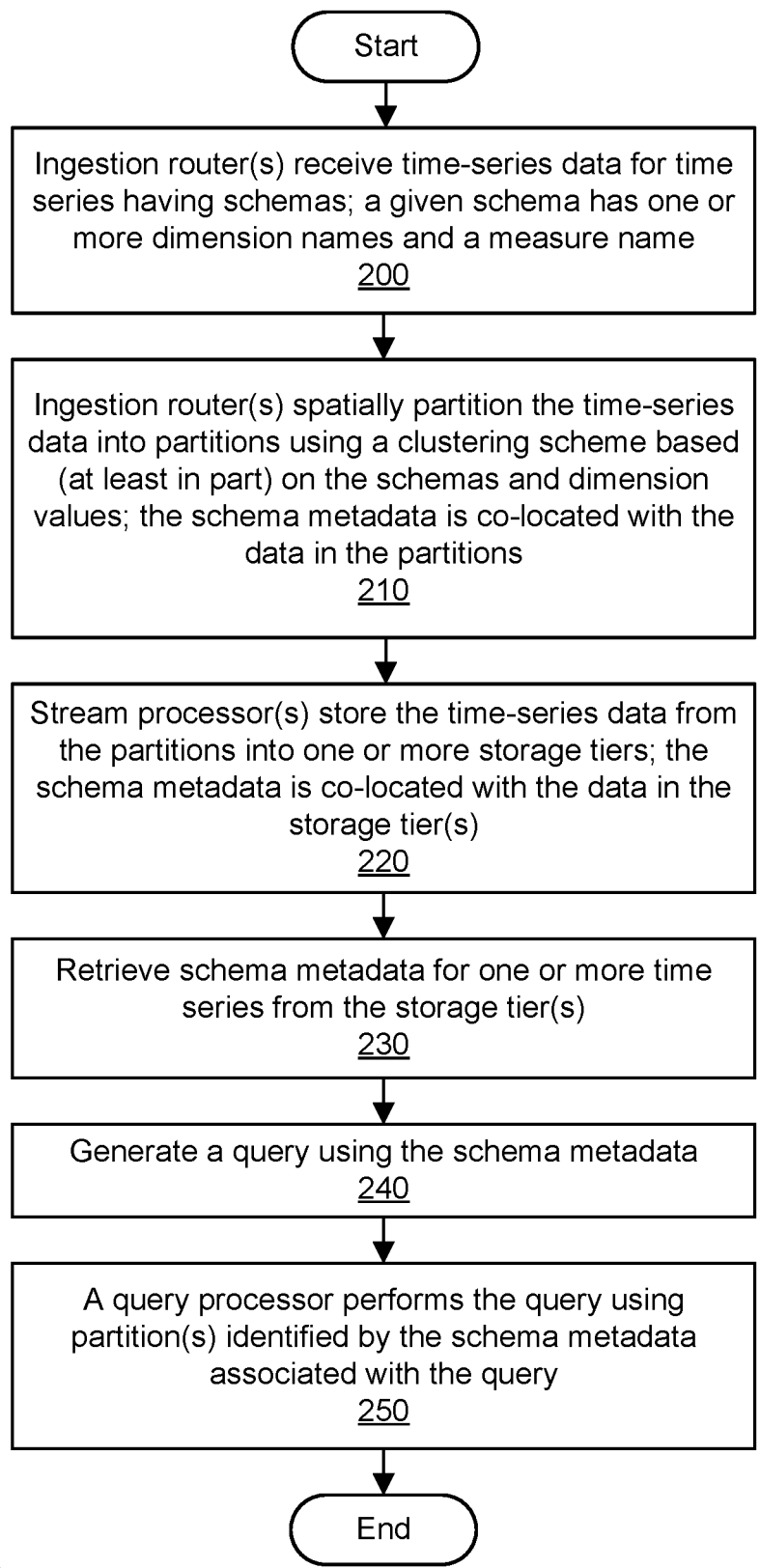
FIG. 2 is a flowchart illustrating a method for schema-based spatial partitioning in a time-series database, according to some embodiments.

FIG. 2 is a flowchart illustrating a method for schema-based spatial partitioning in a time-series database, according to some embodiments. As shown in 200, one or more ingestion routers may receive time-series data from clients. A particular time series may be defined by a schema that includes components such as one or more dimension names (e.g., "Region") and a measure name (e.g., "temperature") and also by dimension values (e.g., "US-West") for the dimension name(s). As ingested by the time-series database, an element of time-series data may include all the schema components, one or more dimension values, and a measure value that represents a particular data point in the time series. In one embodiment, the ingestion router(s) may derive the schema for an element of time-series data from the ingested information and not necessarily from a formal definition of a schema by a customer that manages the client devices.

As shown in 210, the ingestion router(s) may divide the time-series data into a plurality of non-overlapping partitions on a spatial dimension. The ingestion router(s) may use a clustering scheme to divide the ingested data into the partitions. The clustering scheme may co-locate related time series for optimization of queries and other tasks. The clustering scheme may represent a multi-level hashing scheme in which a hash value for a time series is generated by concatenating hash values for different components of the schema for the time series. The clustering scheme may be based (at least in part) on schemas and dimension values for individual time series that are derived from ingested data and not necessarily formally specified by customers. For example, to generate a hash representing an individual time series, a clustering scheme for a particular table may first hash the measure name for the various time series, then concatenate a hash for the dimension names, then concatenate a hash for the dimension values. By representing the measure name as a prefix in the hash for an individual time series, various time series that have the same measure name may be clustered together in the partitions and throughout their remaining lifecycle in the database. In one embodiment, the clustering scheme may represent a default scheme that is intended to optimize query performance for a large number (e.g., a majority) of queries for a given table. In one embodiment, the clustering scheme may be selected by a customer, e.g., on a table-by-table basis. The schema metadata (including dimension names, dimension values, and measure names) may be co-located with the time-series metadata (e.g., individual measurements or data points) in the partitions.

As shown in 220, one or more stream processors may store the data from the partitions using one or more storage tiers. For example, over time, the stream processor(s) may store time-series data for one partition into a series of tiles in a "hot" storage tier and/or a series of files or other documents in a "cold" storage tier. The schema metadata may again be co-located with the time-series metadata (e.g., individual measurements or data points) in these tiles or other documents. In one embodiment, a tile or other partition-specific document in the storage tier(s) may include one or more key-value data stores that represent the schema metadata. These key-value data stores may reflect the particular clustering scheme that is used for the partition. For example, a particular tile may include a first key-value data store that stores a mapping between measure names and dimension names, a second key-value data store that stores a mapping between dimension names and dimension values, a third key-value data store that stores a mapping between dimension values and time-series identifiers, and a fourth key-value data store that stores a mapping between time-series identifiers and individual measurements. The schema metadata (including dimension names, dimension values, and measure names) as well as the corresponding time-series data (individual measurements) may be encoded using these key-value data stores.

As shown in 230, at least some of the schema metadata may be retrieved for one or more time series in the storage tier(s). In one embodiment, the query processor(s) and/or control plane may include a component for schema metadata exploration or acquisition. The schema metadata exploration component may determine all or part of the schema metadata for one or more time series associated with one or more partitions. For example, a user may use the schema metadata exploration to identify the partitions for a particular measure name and then drill down into the dimension names in the schema metadata. As another example, a user may use the schema metadata exploration to identify the partitions for a particular measure name and dimension name(s) and then drill down into the dimension values in the schema metadata. The co-location of time-series data with schema metadata may provide for quick discovery of schemas in order to optimize schema exploration as well as queries.

As shown in 240, a query may be generated using the retrieved schema metadata. For example, a user who drilled down into the schemas for a partition may build a query that specifies one or more dimension names and potentially one or more values or ranges of values for the specified dimension(s). The query may also indicate a time range. As shown in 250, a query processor may perform the query using time-series data in the partition(s) identified by the schema metadata associated with the query. In one embodiment, the query processor may use the same clustering (hashing) scheme to identify the partition(s) associated with the hash of the measure name (or other prefix of the partition hash) and implement the query only using the identified partition(s) in the relevant storage tier(s).

Figure 3A:
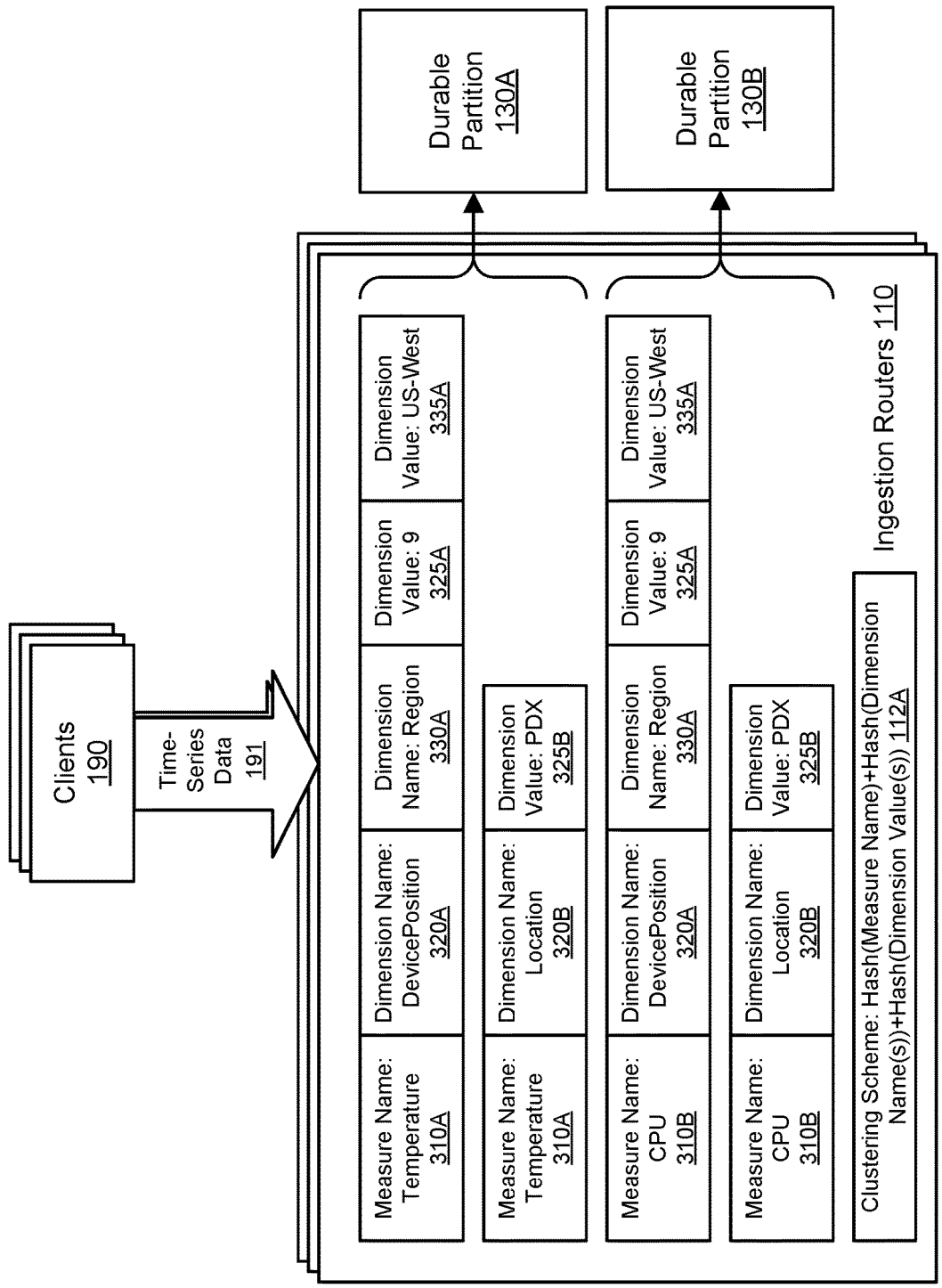
FIG. 3A, FIG. 3B, and FIG. 3C examples of hierarchical clustering of ingested time-series data according to derived schemas, according to some embodiments.
Figure 3B:
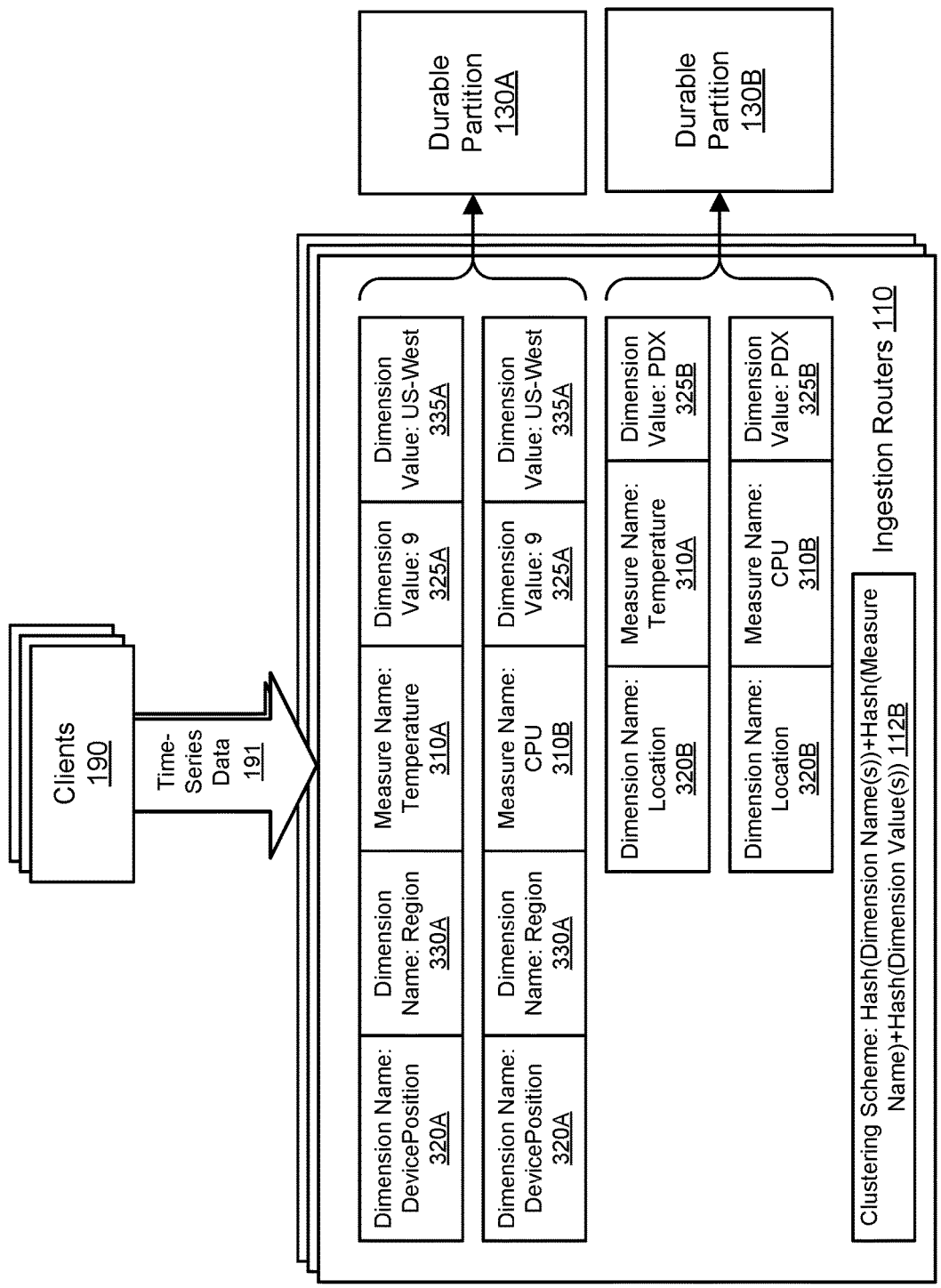
Figure 3C:
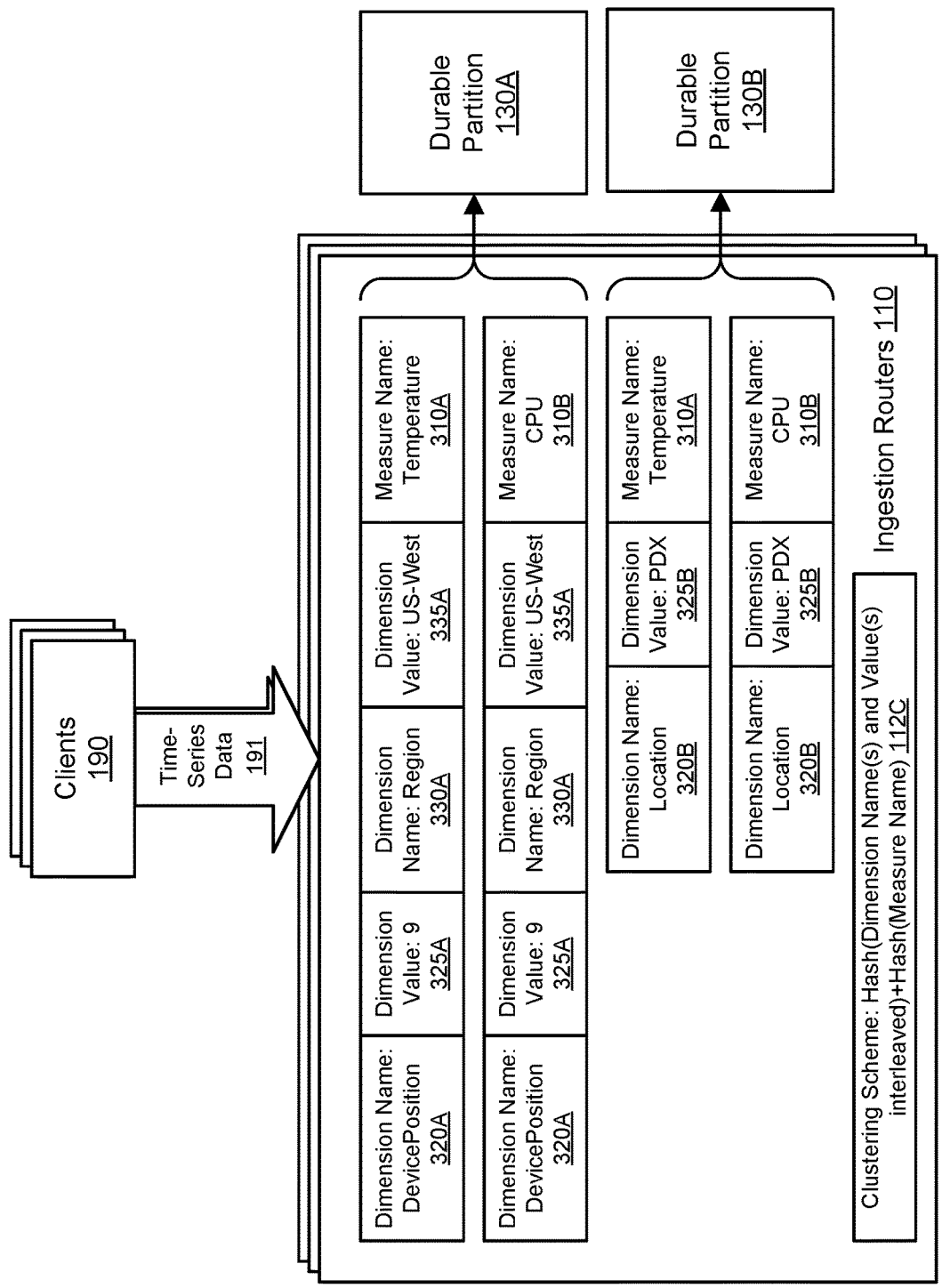

FIG. 3A, FIG. 3B, and FIG. 3C examples of hierarchical clustering of ingested time-series data according to derived schemas, according to some embodiments. The ingestion routers 110 may organize time-series data along a clustering range according to a clustering scheme. Some time series may be related to other time series via the same dimension name(s), dimension value(s), and/or measure names. Using schema-based clustering, related time series may be placed near each other throughout their lifecycle in the time-series database 100. The use of schema-based clustering may achieve a higher degree of compression for time-series data as well as lower latency for queries. The ordering of schema components in the hash built by the clustering scheme may be specified by users or may represent a default clustering scheme. Schema components (including dimension names, dimension values, and measure names) may be derived automatically from ingested data. A hash-based clustering scheme may be used at various stages of the database 100 to enforce the schema-based clustering. The hash-based clustering scheme may have multiple levels. The clustering scheme may generate a hash value for a time series by concatenating hash values for different components of the schema for the time series. This hash value may represent a prefix and one or more additional hash components. This hash value may follow a time series throughout its lifecycle in the database 100 such that the same clustering scheme may be used to identify and organize the time series at the stream processors 140, query processors 170, and so on.

As shown in the example of FIG. 3A, a clustering scheme 112A may first hash the measure name for the various time series, then concatenate a hash for the dimension names, then concatenate a hash for the dimension values. Depending upon the selected or default clustering scheme, the dimension names may be concatenated and then hashed as a unit or hashed separately and then the individual hashes concatenated. Similarly, the dimension values may be concatenated and then hashed or hashed separately and then concatenated. By representing the measure name as a prefix in the hash for an individual time series, various time series that have the same measure name may be clustered together in the partitions 130 and throughout their remaining lifecycle in the database 100. For example, one time series may have the measure name 310A "Temperature" as well as the dimension name 320A "DevicePosition" and corresponding dimension value 325A "9" and the dimension name 330A "Region" and corresponding dimension value 335A "US-West." Using the clustering scheme 112A that prioritizes the measure name, this time series may be clustered with another time series having the measure name 310A "Temperature" along with a different dimension name 320B "Location" and corresponding dimension value 325B "PDX." As another example, yet another time series may have the measure name 310B "CPU" as well as the dimension name 320A "DevicePosition" and corresponding dimension value 325A "9" and the dimension name 330A "Region" and corresponding dimension value 335A "US-West." Using the clustering scheme 112A that prioritizes the measure name, this time series may be clustered with another time series having the measure name 310B "CPU" along with a different dimension name 320B "Location" and corresponding dimension value 325B "PDX."

As shown in the example of FIG. 3B, a clustering scheme 112B may first hash the dimension names, then concatenate a hash for the measure name, then concatenate a hash for the dimension values. Depending upon the selected or default clustering scheme, the dimension names may be concatenated and then hashed as a unit or hashed separately and then the individual hashes concatenated. Similarly, the dimension values may be concatenated and then hashed or hashed separately and then concatenated. By representing the dimension name(s) as a prefix in the hash for an individual time series, various time series that have the same dimension name(s) may be clustered together in the partitions 130 and throughout their remaining lifecycle in the database 100. For example, one time series may have the dimension name 320A "DevicePosition" and corresponding dimension value 325A "9" and the dimension name 330A "Region" and corresponding dimension value 335A "US-West," plus a measure name 310A "Temperature." Using the clustering scheme 112A that prioritizes one or more dimension names, this time series may be clustered with another time series having the same dimension name 320A "DevicePosition" and dimension name 330A "Region" but the different measure name 310B "CPU." As another example, two additional time series with the same dimension name 320B "Location" may be clustered together even though they have different measure names 310A "Temperature" and 310B "CPU."

As shown in the example of FIG. 3C, a clustering scheme 112C may interleave the dimension names and dimension values (e.g., a hash of a first dimension name, a hash of a first dimension value, a hash of a second dimension name, a hash of a second dimension value, and so on) and then concatenate a hash for the measure name. Using a clustering scheme 112C with interleaving of dimension names and dimension values, various time series that have the same dimension name(s) and value(s) may be clustered together in the partitions 130 and throughout their remaining lifecycle in the database 100. For example, one time series may have the dimension name 320A "DevicePosition" and corresponding dimension value 325A "9" and the dimension name 330A "Region" and corresponding dimension value 335A "US-West," plus a measure name 310A "Temperature." Using the clustering scheme 112A that prioritizes one or more dimension names and their values, this time series may be clustered with another time series having the same dimension name 320A "DevicePosition" and same value 325A and the same dimension name 330A "Region" and same value 335A but the different measure name 310B "CPU." As another example, two additional time series with the same dimension name 320B "Location" and value 325B "PDX" but different measure names 310A "Temperature" and 310B "CPU" may be clustered together.

Data points for the time series shown in FIG. 3A, FIG. 3B, and FIG. 3C may be mapped to various durable partitions by the ingestion routers 110. As shown in the example, the time-series data may be mapped and routed to partitions 130A and 130B. In one embodiment, different numbers of time series may be mapped to different partitions based (at least in part) on the ingestion rate of those time series. Partitions may be split or merged as appropriate to adapt to changing ingestion rates for various time series. Each durable partition may support streaming. A particular partition may be mapped to a particular stream processor, e.g., for writing data from the partition to a particular storage tier. In one embodiment, partitions 130A-130B may represent shards of a durable data store or streaming service 120. In one embodiment, partitions 130A-130B may represent database tables or other durable storage resources.

Figure 4:
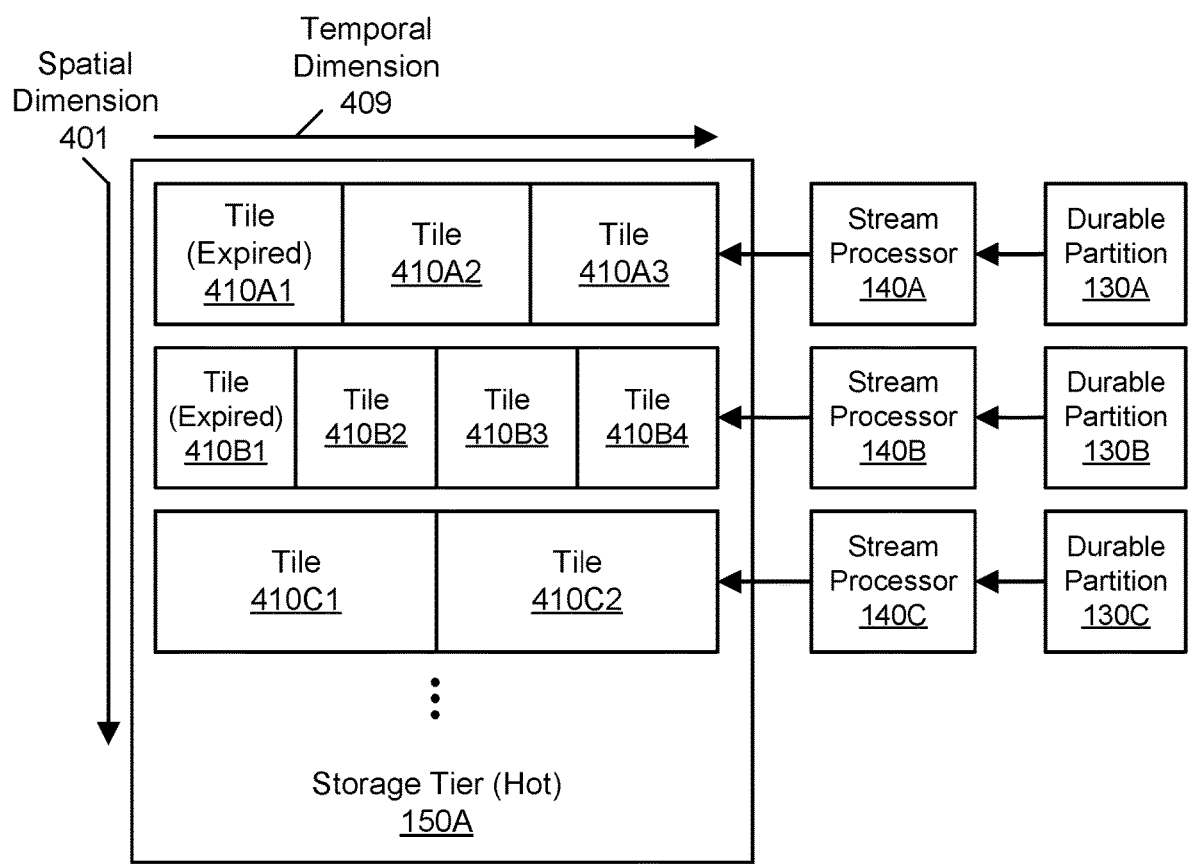
FIG. 4 illustrates an example of storage of time-series data using two-dimensional tiles in a hot tier, according to some embodiments.

FIG. 4 illustrates an example of storage of time-series data using two-dimensional tiles in a hot tier, according to some embodiments. As discussed above, the database 100 may include a hot storage tier such as tier 150A that stores recent data with high availability and low latency. In one embodiment, the hot tier 150A may include a set of storage hosts or storage nodes that include computational resources and memory resources. The storage nodes may store time-series data using tiles that are generated or appended to by stream processors. Tiles may be stored using storage resources such as memory (e.g., RAM) and/or solid-state drives for lower latency of storage and retrieval. Tiles may be replicated across different nodes (e.g., in different data centers or availability zones) for improved durability. Tiles may be partitioned along non-overlapping spatial boundaries, e.g., such that time-series data from one time series is assigned to one tile while time-series data from another time series is assigned to another tile. However, a tile may hold one or more time series. The spatial range may be based on schema-based clustering that seeks to co-locate related time series in the same partition, and the schema-based clustering may be performed by the ingestion routers 110. Tiles may also be partitioned along non-overlapping temporal boundaries. Due to the spatial dimension 401 and the temporal dimension 409, tiles may be said to be two-dimensional. The two-dimensional partitioning represented in tiles may be decoupled from the partitioning of the ingestion stage due to the difference in write latency between the stages. The same partitioning scheme may be used, but the partition ranges may differ. In one embodiment, if the clustering scheme is changed, then subsequent tiles may be reorganized to reflect the clustering change over time.

In the example of FIG. 4, a set of time series may be mapped to durable partitions 130A, 130B, and 130C based on a spatial range (e.g., schema-based clustering). Particular partitions may be mapped to particular stream processors for writing data from the partitions to the hot tier 150A. For example, partition 130A may be assigned to stream processor 140A that writes to the hot tier, partition 130B may be assigned to stream processor 140B that writes to the hot tier, and partition 130C may be assigned to stream processor 140C that writes to the hot tier. For a given time series or partition, tiles representing older windows of time may be termed "closed," while a tile representing a current window of time may be termed "open." Tiles may be closed when the amount of data reached a threshold or when a maximum time interval is reached. For current data points (e.g., data not received out of order), the stream processor for a partition may write to an open tile. Out-of-order data may be routed to previously closed tiles in some circumstances. Tiles whose temporal boundaries are beyond the retention period (e.g., three hours) for the tier and table may be deemed expired and either deleted or marked for deletion. As shown in the example of FIG. 4, stream processor 140A may write to an open tile 410A3 that was preceded in time by a tile 410A2 that was preceded in time by a now-expired tile 410A. Similarly, stream processor 140B may write to an open tile 410B4 that was preceded in time by a tile 410B3 that was preceded in time by a tile 410B2 that was preceded in time by a now-expired tile 410B1. Additionally, stream processor 140C may write to an open tile 410C2 that was preceded in time by a tile 410C1. As discussed above, the contents of a tile may be replicated (e.g., using three replicas) across different location or zones to achieve greater durability of the hot tier.

Figure 5:
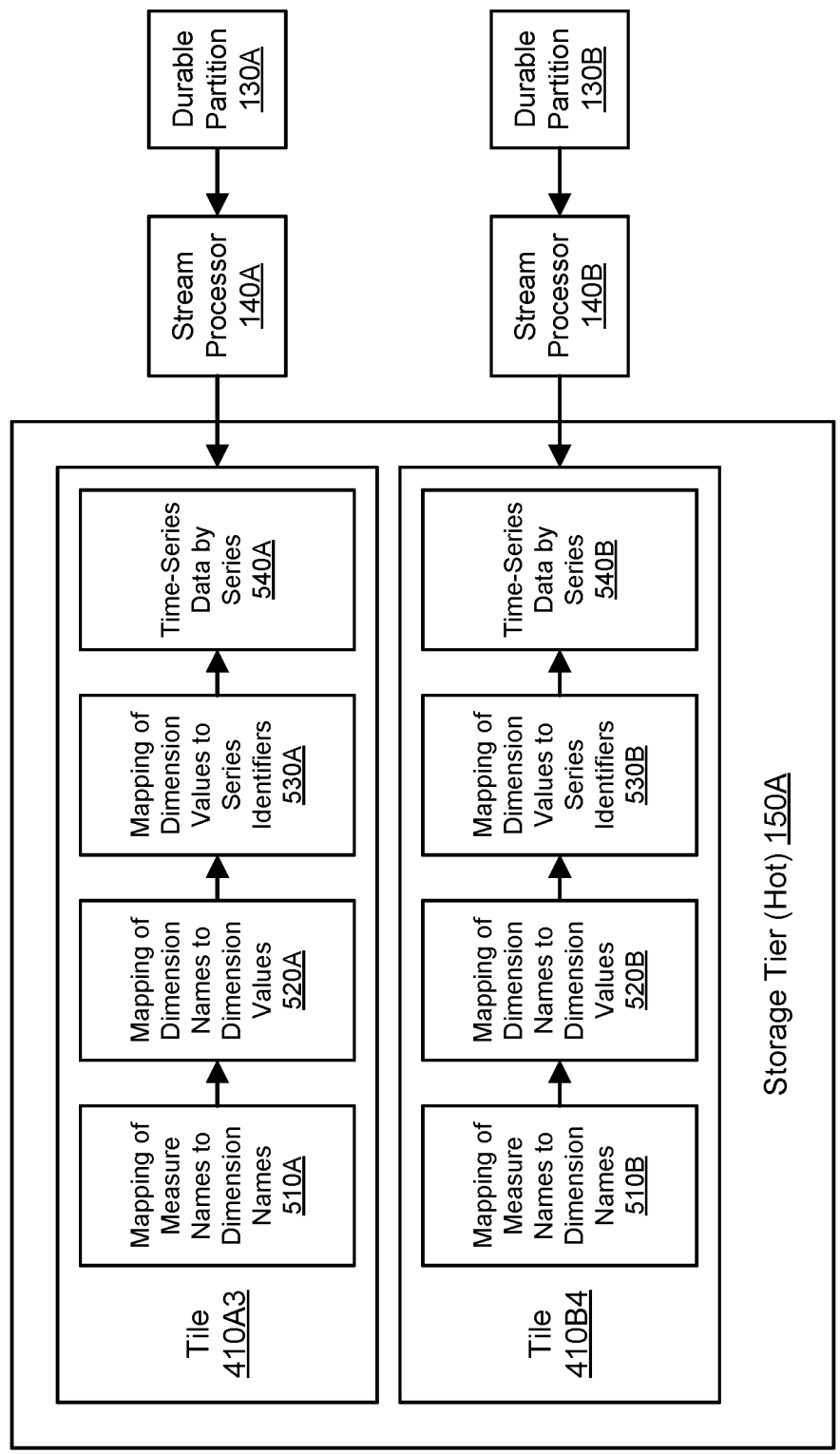
FIG. 5 illustrates the storage of time-series data along with schema metadata using a set of key-value data stores, according to some embodiments.

FIG. 5 illustrates the storage of time-series data along with schema metadata using a set of key-value data stores, according to some embodiments. In one embodiment, a tile or other partition-specific document in the storage tier(s) may include one or more key-value data stores that represent the schema metadata and that point to one another. These key-value data stores may reflect the particular clustering scheme that is used for the partition. For example, a particular tile 410A3 may include a first key-value data store 510A that stores a mapping between measure names and dimension names, a second key-value data store 520A that stores a mapping between dimension names and dimension values, a third key-value data store 530A that stores a mapping between dimension values and time-series identifiers, and a fourth key-value data store 540A that stores a mapping between time-series identifiers and individual measurements. Similarly, a particular tile 410B4 may include a first key-value data store 510B that stores a mapping between measure names and dimension names, a second key-value data store 520B that stores a mapping between dimension names and dimension values, a third key-value data store 530B that stores a mapping between dimension values and time-series identifiers, and a fourth key-value data store 540B that stores a mapping between time-series identifiers and individual measurements. The schema metadata as well as the time-series data (individual measurements) may be encoded using these key-value data stores. The co-located and clustered schema metadata may be used for validation across different time series. For example, a customer may use the schema metadata to ensure that the total number of schemas for a table is less than some threshold amount (e.g., one billion).

Figure 6:
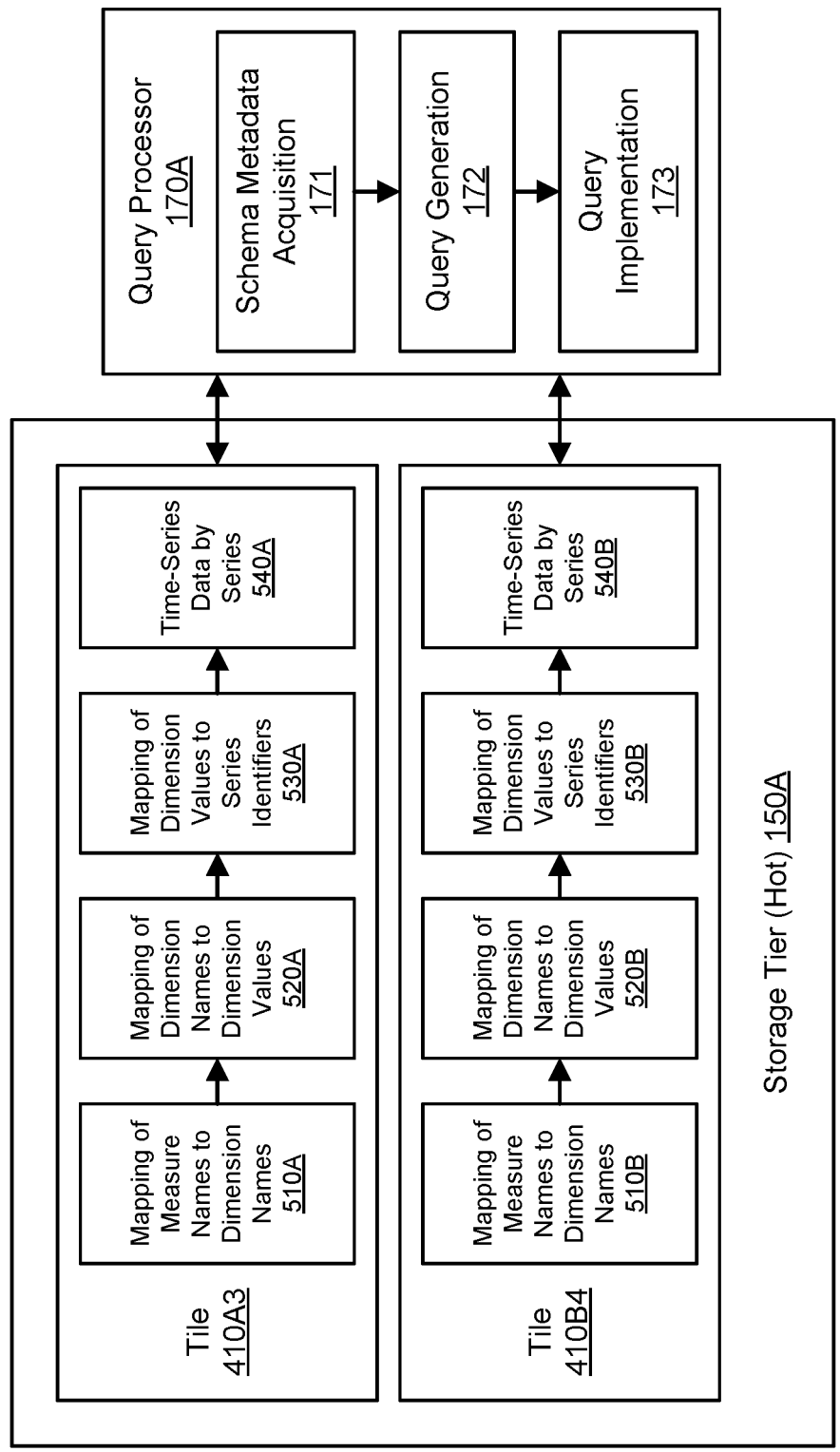
FIG. 6 illustrates the querying of time-series data using schema metadata co-located with the time-series data, according to some embodiments.

FIG. 6 illustrates the querying of time-series data using schema metadata co-located with the time-series data, according to some embodiments. In one embodiment, a query processor 170A may include a component 171 for schema metadata acquisition. The schema metadata acquisition component 171 may determine all or part of the schema metadata for one or more time series associated with one or more partitions. For example, a user may use the schema metadata acquisition 171 to identify the partitions for a particular measure name and then drill down into the dimension names in the schema metadata, e.g., in tiles 410A3 and/or 410B4 in the storage tier 150A. The co-location of time-series data with schema metadata using key-value data stores to map one portion of the schema to another may provide for quick discovery of schemas in order to optimize schema exploration as well as queries.

In one embodiment, the query processor 170A may include a component 172 for query generation. Using this component 172, a query may be generated using the acquired schema metadata. For example, a user who drilled down into the schemas for a partition may build a query that specifies one or more dimension names and potentially one or more values or ranges of values for the specified dimension(s). The query may also indicate a time range. In one embodiment, the query processor 170A may include a component 173 for query implementation. Using this component 173, the query processor 170A may perform the query using time-series data in the partition(s) identified by the schema metadata associated with the query. In one embodiment, the query processor 170A may use the same clustering (hashing) scheme 112 to identify the partition(s) associated with the hash of the measure name (or other prefix of the partition hash) and implement the query only using the identified partition(s) in the relevant storage tier(s).

Figure 7:
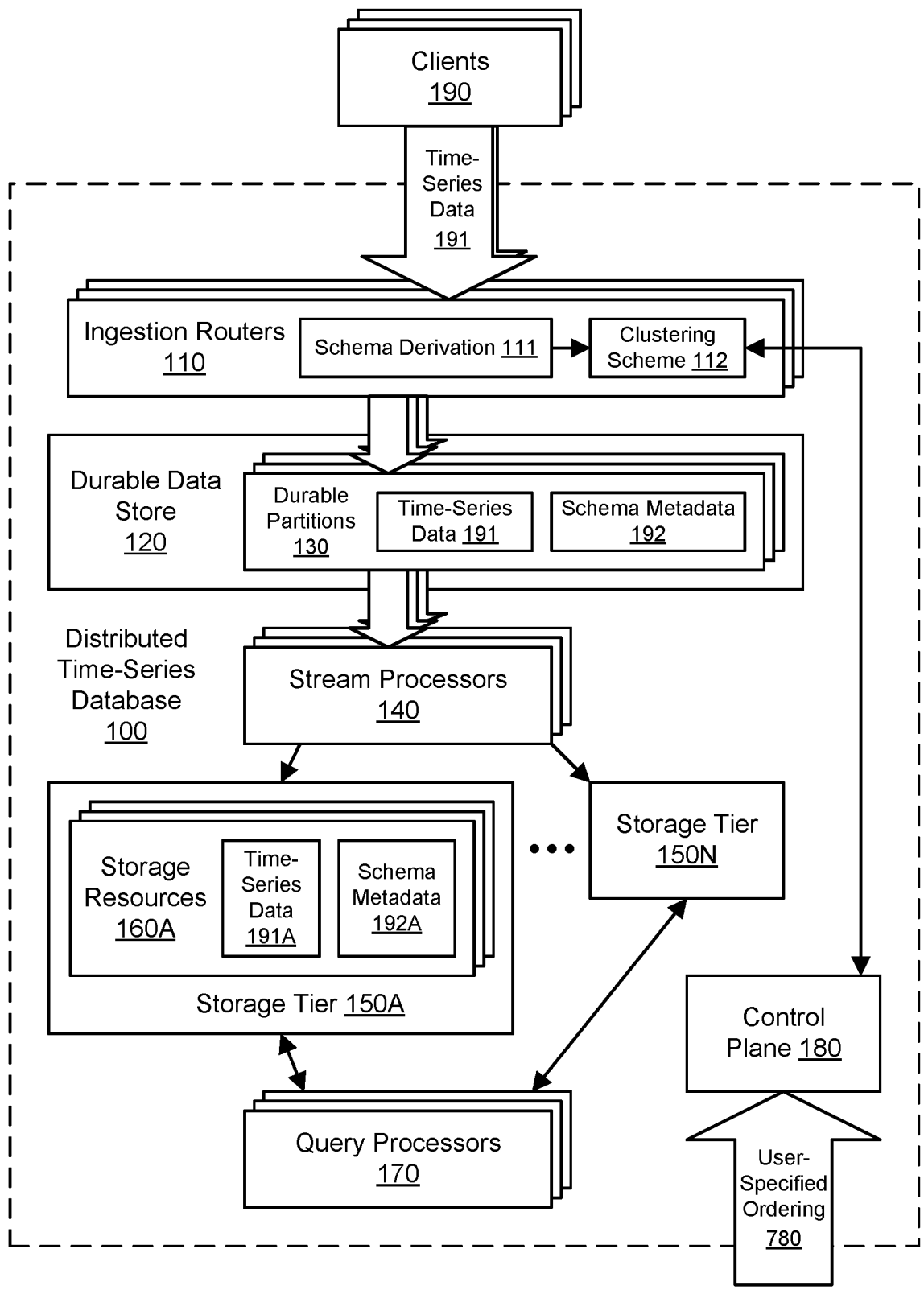
FIG. 7 illustrates further aspects of the example system environment for schema-based spatial partitioning in a time-series database, including the use of a user-specified ordering of schema components for clustering, according to some embodiments.

FIG. 7 illustrates further aspects of the example system environment for schema-based spatial partitioning in a time-series database, including the use of a user-specified ordering of schema components for clustering, according to some embodiments. In one embodiment, customers may indicate orderings of schema components for particular time series, e.g., to optimize storage and retrieval of time-series data for the needs of particular customers. A shown in FIG. 7, a customer may provide a user-specified ordering 780. The ordering 780 may represent a relative priority of all or part of the schema components (dimension name(s), dimension value(s), and measure name). For example, the ordering 780 may indicate that the measure name should be hashed first, and then a default ordering should be used (e.g., dimension name(s) and then dimension value(s)). As another example, the ordering 780 may indicate that a particular dimension name (e.g., "Region") should be hashed first and another dimension name (e.g., "DeviceType") should be hashed next. In the absence of such customer-provided information, a default clustering scheme may be used to partition time-series data such that the majority of queries are optimized.

Illustrative Computer System

In at least some embodiments, a computer system that implements a portion or all of one or more of the technologies described herein may include a computer system that includes or is configured to access one or more computer-readable media. FIG. 8 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or nonvolatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 8 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more processors and respective memories configured to implement one or more ingestion routers of a time-series database, the one or more ingestion routers configured to:
receive elements of time-series data of a plurality of time series from a plurality of clients; and
derive respective schemas for individual ones of the plurality of time series, wherein an individual schema for a respective one of the plurality of time series comprises one or more dimension names and a measure name;
one or more processors and respective memories configured to implement one or more stream processors of the time-series database, the one or more stream processors configured to:
store, into one or more storage tiers, the elements of time-series data and the derived schemas as metadata for the time-series data; and
one or more processors and respective memories configured to implement one or more query processors of the time-series database, the one or more query processors configured to:

perform a query of the time-series data in one or more of the storage tiers according to the metadata in one or more of the storage tiers.

2. The system as recited in claim 1, wherein to derive the respective schemas the one or more ingestion routers are configured to map respective measure names of individual ones of the time series to respective dimension names.

3. The system as recited in claim 2, wherein the one or more storage tiers comprise key-value data stores that store a mapping of the respective measure names to the respective dimension names, a mapping of the dimension names to respective dimension values of the elements of the time-series data, and a mapping of the respective dimension values to time-series identifiers, and wherein the query is performed using the key-value data stores.

4. The system as recited in claim 2, wherein the query indicates a particular measure name, and wherein the one or more stream processors of the time-series database are further configured to:
 determine a hash of the particular measure name;
 determine a particular one or more partitions of a clustering scheme that are associated with the hash of the particular measure name; and
 determine a result of the query using elements of time-series data from the particular one or more partitions of the clustering scheme that are associated with the hash of the particular measure name.

5. The system as recited in claim 4, wherein the one or more ingestion routers of a time-series database are configured to
 ingest additional elements of the time-series data having a modified schema; and
 modify a partitioning of the clustering scheme of the time-series database based at least in part on the modified schema.

6. The system as recited in claim 4, wherein the clustering scheme comprises interleaving at least some of the dimension names and at least some of the dimension values.

7. A method, comprising:
 performing, at one or more nodes of a database individually comprising at least one processor and a memory:
  receiving elements of time-series data of a plurality of time series from a plurality of clients;
  deriving respective schemas for individual ones of the plurality of time series, wherein an individual schema for a respective one of the plurality of time series comprises one or more dimension names and a measure name;
  storing, into one or more storage tiers, the elements of time-series data and the derived schemas as metadata for the time-series data; and
  performing a query of the time-series data in one or more of the storage tiers according to the metadata in one or more of the storage tiers.

8. The method as recited in claim 7, wherein the deriving comprises mapping of respective measure names of individual ones of the time series to respective dimension names.

9. The method as recited in claim 8, wherein the one or more storage tiers comprise key-value data stores that store a mapping of the respective measure names to the respective dimension names, a mapping of the dimension names to respective dimension values of the elements of the time-series data, and a mapping of the respective dimension values to time-series identifiers, and wherein the query is performed using the key-value data stores.

10. The method as recited in claim 7, wherein the query indicates a particular measure name, and wherein the method further comprises:
 determining a hash of the particular measure name;
 determining a particular one or more partitions of a clustering scheme that are associated with the hash of the particular measure name; and
 determining a result of the query using elements of time-series data from the particular one or more partitions of the clustering scheme that are associated with the hash of the particular measure name.

11. The method as recited in claim 10, wherein the clustering scheme is determined based at least in part on input indicating an ordering among one or more dimension names, one or more dimension values, and a measure name for an individual schema.

12. The method as recited in claim 9, further comprising:
 ingesting, by the time-series database, additional elements of the time-series data having a modified schema; and
 modifying a partitioning of the clustering scheme of the time-series database based at least in part on the modified schema.

13. The method as recited in claim 9, wherein the clustering scheme comprises interleaving at least some of the dimension names and at least some of the dimension values.

14. One or more non-transitory computer-readable storage media storing program instructions that, when executed on or across one or more processors, perform:
 receiving elements of time-series data of a plurality of time series from a plurality of clients;
 deriving respective schemas for individual ones of the plurality of time series, wherein an individual schema for a respective one of the plurality of time series comprises one or more dimension names and a measure name;
 storing, into one or more storage tiers, the elements of time-series data and the derived schemas as metadata for the time-series data; and
 performing a query of the time-series data in one or more of the storage tiers according to the metadata in one or more of the storage tiers.

15. The one or more non-transitory computer-readable storage media as recited in claim 14, wherein the deriving comprises mapping of respective measure names of individual ones of the time series to respective dimension names.

16. The one or more non-transitory computer-readable storage media as recited in claim 15, wherein the one or more storage tiers comprise key-value data stores that store a mapping of the respective measure names to the respective dimension names, a mapping of the dimension names to respective dimension values of the elements of the time-series data, and a mapping of the respective dimension values to time-series identifiers, and wherein the query is performed using the key-value data stores.

17. The one or more non-transitory computer-readable storage media as recited in claim 14, further comprising additional program instructions that, when executed on or across the one or more processors, perform:
 determining a hash of the particular measure name;
 determining a particular one or more partitions of a clustering scheme that are associated with the hash of the particular measure name; and
 determining a result of the query using elements of time-series data from the particular one or more partitions of the clustering scheme that are associated with the hash of the particular measure name.

18. The one or more non-transitory computer-readable storage media as recited in claim 17, further comprising:

performing, by the time-series database, validation of one or more of the schemas having a particular measure name, wherein the validation is performed using one or more partitions of the clustering scheme associated with the particular measure name.

19. The one or more non-transitory computer-readable storage media as recited in claim 17, further storing program instructions that, when executed on or across one or more processors, perform:

ingesting, by the time-series database, additional elements of the time-series data having a modified schema; and modifying a partitioning of the clustering scheme of the time-series database based at least in part on the modified schema.

20. The one or more non-transitory computer-readable storage media as recited in claim 17, wherein the clustering scheme comprises interleaving at least some of the dimension names and at least some of the dimension values.

* * * * *